United States Patent
Nijakowski et al.

(10) Patent No.: US 10,265,809 B2
(45) Date of Patent: Apr. 23, 2019

(54) METHOD OF JOINING WORKPIECES USING A SLIDING PART COUPLING PORTION

(71) Applicant: DANA AUTOMOTIVE SYSTEMS GROUP, LLC, Maumee, OH (US)

(72) Inventors: Christopher M. Nijakowski, Swanton, OH (US); Anthony F. Kehres, Maumee, OH (US)

(73) Assignee: Dana Automotive Systems Group, LLC, Maumee, OH (US)

(*) Notice: Subject to any disclaimer, the term of this patent is extended or adjusted under 35 U.S.C. 154(b) by 12 days.

(21) Appl. No.: 14/392,109

(22) PCT Filed: May 9, 2014

(86) PCT No.: PCT/US2014/037499
§ 371 (c)(1),
(2) Date: Nov. 10, 2015

(87) PCT Pub. No.: WO2014/186227
PCT Pub. Date: Nov. 20, 2014

(65) Prior Publication Data
US 2016/0114437 A1 Apr. 28, 2016

Related U.S. Application Data

(60) Provisional application No. 61/822,671, filed on May 13, 2013.

(51) Int. Cl.
*B23K 20/12* (2006.01)
*B23K 37/053* (2006.01)
(Continued)

(52) U.S. Cl.
CPC .......... *B23K 37/0533* (2013.01); *B23K 20/12* (2013.01); *B23K 35/0255* (2013.01);
(Continued)

(58) Field of Classification Search
CPC .............. B23K 20/12; B23K 2201/006; B23K 2201/06; B23K 35/0255; B23K 37/0435; B23K 37/0533; B32B 15/01
See application file for complete search history.

(56) References Cited

U.S. PATENT DOCUMENTS 3,406,890 A * 10/1968 Korte ................. B23K 20/12
228/2.3
3,516,591 A * 6/1970 Gage ................. B23K 20/12
228/2.3
(Continued)

FOREIGN PATENT DOCUMENTS

JP 01113185 A * 5/1989
JP 2000-042761 A * 2/2000
JP 2000-176656 A 6/2000

OTHER PUBLICATIONS

European Patent Office, The International Search Report and Written Opinion, dated Oct. 16, 2014, 9 pages, International Search Report of PCT/US2014/037499, European Patent Office, Rijswijk, Netherlands.

*Primary Examiner* — Erin B Saad
*Assistant Examiner* — Carlos J Gamino
(74) *Attorney, Agent, or Firm* — Marshall & Melhorn, LLC

(57) ABSTRACT

A method of joining workpieces includes locating first ends of two first workpieces in a moveable part coupling portion. The lengths of the first workpieces are measured. Any difference in length between the first workpieces is determined. Two additional workpieces are located adjacent the first ends of the first workpieces based on the determined difference in length. The first workpieces are connected to the second workpieces.

13 Claims, 3 Drawing Sheets

(51) Int. Cl.
*B23K 37/04* (2006.01)
*B23K 35/02* (2006.01)
*B32B 15/01* (2006.01)
*B23K 101/00* (2006.01)
*B23K 101/06* (2006.01)

(52) U.S. Cl.
CPC .......... *B23K 37/0435* (2013.01); *B32B 15/01* (2013.01); *B23K 2101/006* (2018.08); *B23K 2101/06* (2018.08)

(56) References Cited

U.S. PATENT DOCUMENTS

| | | | | |
|---|---|---|---|---|
| 3,613,982 | A | * | 10/1971 | Hollenberg .......... B23K 20/121 156/73.5 |
| 3,800,995 | A | | 4/1974 | Franks et al. |
| 3,804,318 | A | * | 4/1974 | Louw .................... B23K 20/12 156/73.5 |
| 4,049,182 | A | * | 9/1977 | Louw .................... B23K 20/12 228/113 |
| 4,060,190 | A | * | 11/1977 | Paolini ................. B23K 20/129 228/102 |
| 2006/0196916 | A1 | * | 9/2006 | Goldstein ................ B23K 9/08 228/114.5 |
| 2007/0181639 | A1 | | 8/2007 | Rudolph et al. |
| 2010/0206861 | A1 | | 8/2010 | Rudolph et al. |

\* cited by examiner

METHOD OF JOINING WORKPIECES USING A SLIDING PART COUPLING PORTION

RELATED APPLICATIONS

This application claims priority to and benefit from U.S. Patent Application Ser. No. 61/822,671 filed on May 13, 2013 which is currently pending and fully incorporated by reference herein.

BACKGROUND

It is well-known to attach a first workpiece to a second workpiece for various purposes. In one example, an end fitting is attached to a driveshaft tube, such as by welding.

Continuing with the example, it is preferred that as many end fittings be attached to as many tubes as possible to achieve economies of scale and efficiency. Thus, if a method was known to simultaneously attach two end fittings to two tubes, a greater output of completed tubes could be realized.

Previous attempts have been made to simultaneously attach two end fittings to two tubes, but the apparatus utilized in the process was problematic and did not result in satisfactory results. One disadvantageous result of the prior methods was that the tubes often did not have exactly the same length. Instead, tubes inserted into a machine might have slight variations in their length. The variations in length prevented the machine from properly positioning the welding apparatus for the first and second workpieces at the correct locations. The machine would generate an error and be unable to complete the welding step.

In view of the problems of the known prior art devices, it would be advantageous for a machine to be able to simultaneously connect two first workpieces with two second workpieces, such as by welding, even when the first workpieces do not have the same length.

SUMMARY

A method of joining workpieces includes securing first ends of two first workpieces in a device capable of selective axial movement. The length of each of the first workpieces is determined. The difference in length between the first two parts is determined. The axial location of both first parts is simultaneously adjusted to account for any differences in length. Two second workpieces are located adjacent the first ends of the first two workpieces. The first and second workpieces are simultaneous joined together.

DESCRIPTION OF THE DRAWINGS

Exemplary embodiments of the present disclosure will now be described by way of example with reference to the accompanying drawings, in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
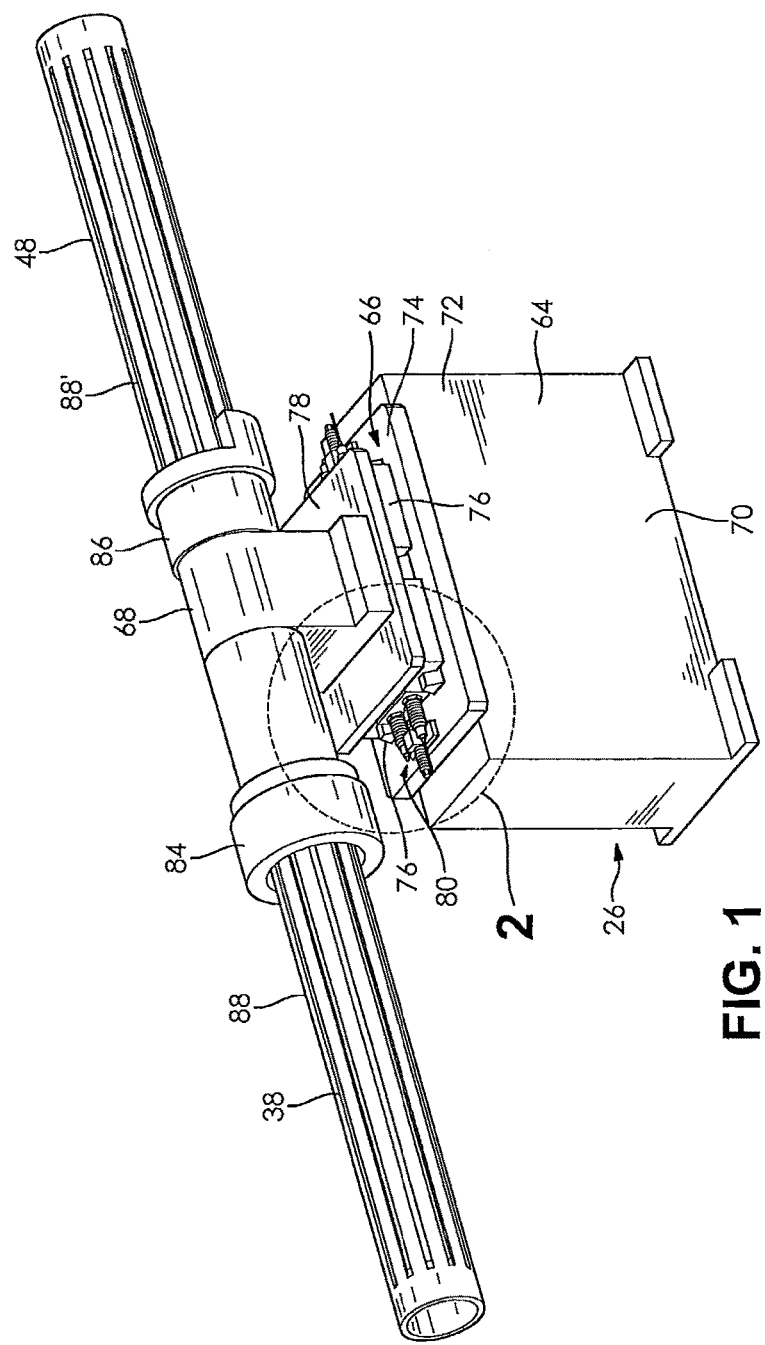
FIG. 1 is a perspective view of two workpieces and a pedestal assembly.
Figure 2:
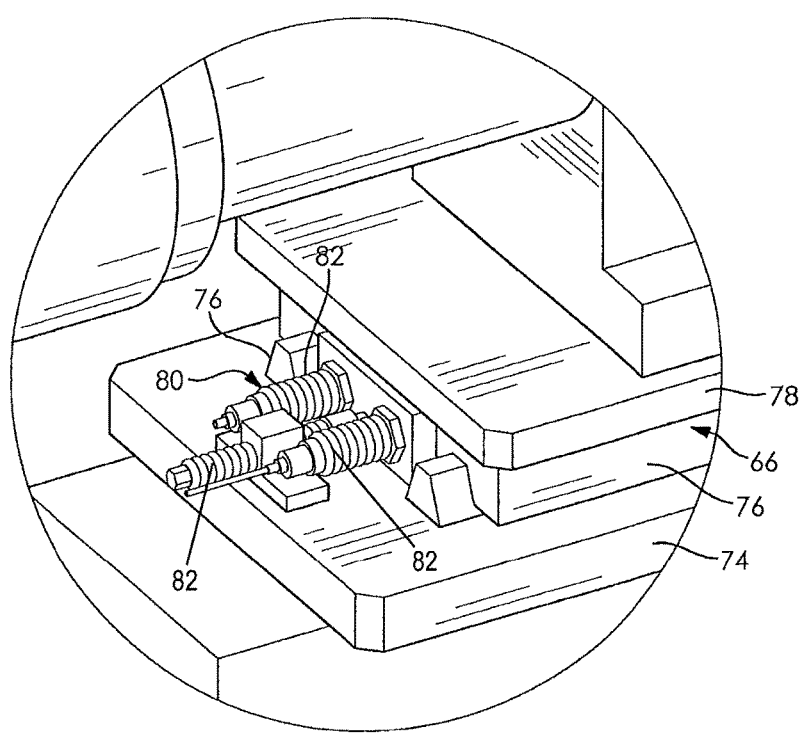
FIG. 2 is a perspective view of a portion of FIG. 1.
Figure 3:
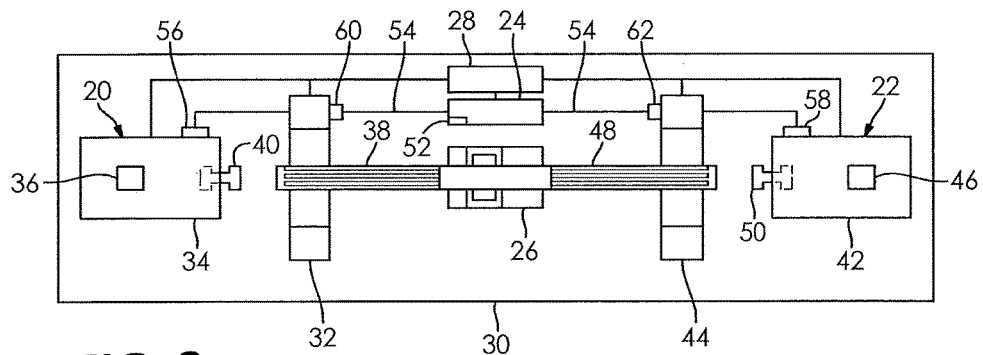
FIG. 3 is a top view of a welding apparatus in a first condition.
Figure 4:
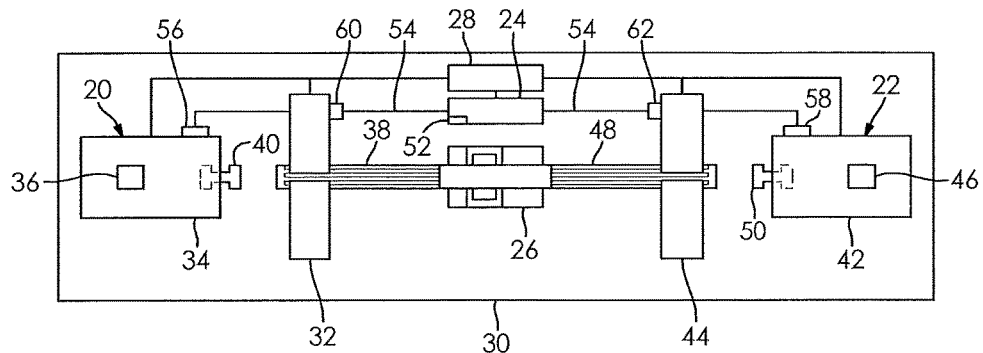
FIG. 4 is a top view of the welding apparatus of FIG. 3 in a second condition.
Figure 5:
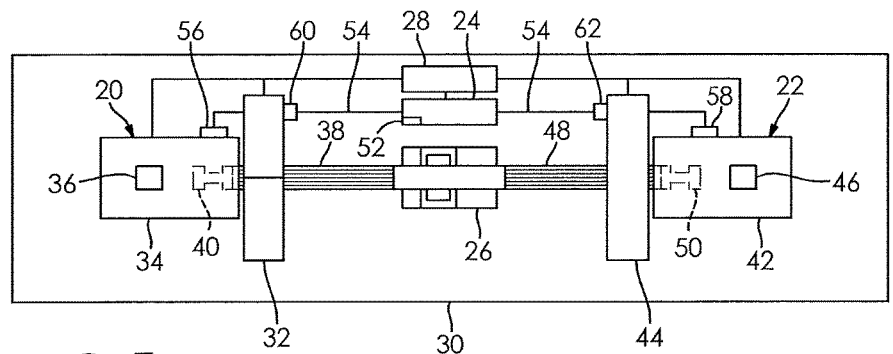
FIG. 5 is a top view of the welding apparatus of FIG. 3 in a third condition.

FIGS. 1-5 illustrate a welding apparatus according to an embodiment of the invention. The welding apparatus includes a first welding assembly 20, a second welding assembly 22, a hydraulic device 24, a pedestal assembly 26, and a controller 28. The welding assemblies 20, 22, the hydraulic device 24, and the pedestal assembly 26 are disposed on and secured to a platform 30; however, it is understood that the components may be disposed and secured in any manner that allows an accurate geometric relationship to one another to be determined. Further, it is understood that the welding assemblies 20, 22, the hydraulic device 24, and the pedestal assembly 26 are typically disposed within an enclosure (not shown) commonly used in automated operations. The controller 28 is in communication with the first welding assembly 20, the second welding assembly 22, and the hydraulic device 24 as best seen in FIGS. 3-5.

As shown in FIGS. 3-5, the first welding assembly 20 is disposed adjacent a first end of the platform 30. The first welding assembly 20 comprises a first clamping device 32, a first welding device 34, and at least one position sensor 36. Each of the first clamping device 32, the first welding device 34, and the at least one position sensor 36 are in communication with the controller 28. The first clamping device 32 is disposed intermediate a middle portion of the platform 30 and the first welding device 34.

The first clamping device 32 may be placed in an engaged position, a partially engaged position, and a disengaged position by the controller. In the engaged position, the first clamping device 32 closes, coupling a first part 38 thereto. In the partially engaged position, the first clamping device 32 is partially closed, to facilitate orienting the first part 38 along an axis of the first part 38 with respect to the first welding device 34. In the disengaged position, the first clamping device 32 is open, and the first part 38 may be disposed into or removed from the first welding device 34.

The first welding device 34 performs a welding operation to couple the first part 38 to a second part 40, as further described herein. The second part 40 is disposed against, or adjacent, the first part 38; however, it is understood that the second part 40 may be disposed within or about the first part 38. When the first clamping device 32 is placed in the engaged position, the controller 28 may instruct the first welding device 34 to perform the welding operation. The first welding device 34 is a numerically controlled welding device, and a position of the first welding device 34 is controlled by the controller 28.

The first part 38 may be a driveshaft component, such as a driveshaft tube. The second part 40 may be a driveshaft tube end fitting. While examples of the first and second parts are provided, other parts are permissible.

The at least one position sensor 36 forms a portion of the first welding assembly 20 and is in communication with the controller 28 to determine a position of at least one of the first part 38 and the second part 40 when the first clamping device 32 is placed in the engaged position or the partially engaged position. Information collected by the at least one position sensor 36 is transmitted to the controller 28 for use by the controller 28 in determining a position of the first welding device 34 and a second welding device 42. It is understood that the first welding device 34 and the second welding device 42 operate in a symmetrical or "mirror image" manner about a reference plane passing through the middle portion of the platform 30 in response to instructions transmitted by the controller 28. In other words, if the first welding device 34 moves in an axial direction by a predetermined distance, then the second welding device 42 moves in the same axial direction by the same distance.

The second welding assembly 22 is disposed adjacent a second end of the platform 30. The second welding assembly 22 comprises a second clamping device 44, the second welding device 42, and at least one position sensor 46. Each of the second clamping device 44, the second welding device 42, and the at least one position sensor 46 are in communication with the controller 28. The second clamping device 44 is disposed intermediate the middle portion of the platform 30 and the second welding device 42.

The second clamping device 44 may be placed in an engaged position, a partially engaged position, and a disengaged position by the controller 28. In the engaged position, the second clamping device 44 closes, coupling a third part 48 of a predetermined size thereto. In the partially engaged position, the second clamping device 44 is partially closed, to facilitate orienting the third part 48 along an axis of the part 48 with respect to the second welding device 42. In the disengaged position, the second clamping device 44 is open, and the third part 48 may be disposed into or removed from the second welding assembly 22.

The second welding device 42 performs a welding operation to couple the third part 48 to a fourth part 50. The fourth part 50 is disposed against, or adjacent, the third part 48; however, it is understood that the fourth part 50 may be disposed within or about the third part 48.

When the second clamping device 44 is placed in the engaged position, the controller 28 may instruct the second welding device 42 to perform the welding operation. The second welding device 42 is a numerically controlled welding device, and a position of the second welding device 42 is controlled by the controller 28.

The third and fourth parts 48, 50 may be the same as the first and second parts 38, 40, respectively, as discussed above.

The at least one position sensor 46 forms a portion of the second welding assembly 22 and is in communication with the controller 28 to determine a position of at least one of the third part 48 and the fourth part 50 when the second clamping device 44 is placed in the engaged position or the partially engaged position. Information collected by the at least one position sensor 46 is transmitted to the controller 28 for use by the controller 28 in determining a position of the first welding device 34 and the second welding device 42. As mentioned hereinabove, it is understood that the first welding device 34 and the second welding device 42 of the welding apparatus operate in a symmetrical or "mirror image" manner about the reference plane passing through the middle portion of the platform in response to instructions transmitted by the controller 28.

The hydraulic device 24 comprises at least a hydraulic pump 52, a plurality of conduits 54, and at least one actuation device. The hydraulic device 24 is in communication with the controller 28, the first welding assembly 20 and the second welding assembly 22 to facilitate operation of the first welding assembly 20 and the second welding assembly 22 in response to instructions transmitted by the controller 28.

A first actuation device 56 is on the first welding device 34, a second actuation device 58 is on the second welding device 42, a third actuation device 60 is on the first clamping device 32 and a fourth actuation device 62 is on the second clamping device 44. As a non-limiting example, the hydraulic device 24 may facilitate placing the first clamping device and the second clamping device in the engaged position, the partially engaged position, and the disengaged position. As a second non-limiting example, the hydraulic device may facilitate orienting or holding the first part 38 with respect to the second part 40 and the third part 48 with respect to the fourth part 50, as described below.

As shown in FIG. 1, the pedestal assembly 26 supports two first parts 38 and facilitates orienting each of the first parts 38 along the axis of each of the first parts 38 with respect to the first clamping device 32 and the second clamping device 44. The pedestal assembly 26 comprises a support portion 64, a slide device 66, and a part coupling portion 68. The pedestal assembly 26 is disposed on the middle portion of the platform 30.

The support portion 64 may have any shape capable of rigidly supporting the slide device 66 and the part coupling portion 68. The support portion 64 is preferably formed from a metal; however, it is understood that the support portion 64 may be formed from any rigid material. A lower portion 70 of the support portion 64 is securely coupled to the platform 30. An upper portion 72 of the support portion 64 is coupled to the slide device 66.

The slide device 66 facilitates movement of the part coupling portion 68 along the axis of the first part 38 and the third part 48 with respect to the support portion 64 and the first clamping device 32, and the second clamping device 44. In other words, the clamping portion 32, 44 and the first part 38 and third part 48 are axially fixed with respect to each other but move together with respect to the slide device 66. The slide device 66 comprises a first plate 74, a pair of linear bearings 76, a second plate 78, and at least one axial restraint device 80, as shown in FIG. 2

The first plate 74 may be such as a substantially rectangular shaped member rigidly coupled to the upper portion 72 of the support portion 64; however, it is understood that the first plate 74 may have any other shape. The first plate 74 is preferably formed from a metal; however, it is understood that the first plate 74 may be formed from any rigid material. A portion of each of the linear bearings 76 is rigidly coupled to the first plate 74.

Each of the linear bearings 76 is a linear bearing as known in the art. The linear bearings 76 facilitate movement of the second plate 78 along the axis of the first part 38 and third part 48 with respect to the first plate 74. A second portion of each of the linear bearings 76 is rigidly coupled to the second plate 78.

The second plate 78 may be such as a substantially rectangular shaped member rigidly coupled to the part coupling portion 68; however, it is understood that the second plate 78 may have any other shape. The second plate 78 is preferably formed from a metal; however, it is understood that the second plate 78 may be formed from any rigid material.

As shown in FIGS. 1 and 2, preferably there are two axial restraint devices 80 that may be coupled to the first plate 74 and/or the second plate 78 to limit movement of the second plate 78 along the axis of the first part 38 and the third part 48. Each of the axial restraint devices 80 may comprise a portion biased with a spring 82. The portion biased with the spring 82 militates against a sudden stop that the axial restraint device 80 may cause when the second plate 78, moving along the axis of the first part 38 and third part 48 reaches a terminal position. The spring 82 resists a force trying to move the plate 78 to a terminal position and biases the plate 78 back to a neutral position.

The part coupling portion 68 is rigidly coupled to the second plate 78. The part coupling portion 68 is preferably formed from a metal; however, it is understood that the part coupling portion 68 may be formed from any rigid material. The part coupling portion 68 includes a first holding portion 84 and a second holding portion 86, which are opposingly oriented on the part coupling portion 68. Each of the first holding portion 84 and the second holding portion 86 holds a first end portion 88 of the first part 38 and a first end portion 88' of the third part 48.

In use, the controller 28 allows a welding operation to be performed by the first welding device 34 and the second welding device 42 when the first part 38 and the third part 48, which may have different lengths, are disposed in the welding apparatus described herein. The slide device 66 allows a position of the first part 38 and the third part 48, disposed in the part coupling portion 68 to be axially adjusted to facilitate welding operations. More particularly, the slide device 66 permits the first part 38 and the third part 48 to be welded to the second part 40 and fourth part 50 even when the first and third parts 38, 48 are not equal length. Variability of length may be common among the first part and third parts 38, 48, and the slide device 66 facilitates accurately positioning the first part 38 and the third part 48, so that axial length difference between a second end portion 90, 90' (disposed adjacent the welding devices, respectively) of the first part 38 and the third part 48 and each of the welding devices 34, 42 during the welding operation is minimal.

To perform the welding operation, the first end portions 88, 88' of first part 38 and the third part 48 are placed into the part coupling portion 68 of the pedestal assembly 26 and the second end portions 90, 90' are placed adjacent the first clamping device 32 and the second clamping device 44, respectively. Next, the second part 40 is disposed adjacent the first part 38, and the fourth part 50 is disposed adjacent the third part 48. It is understood that the first welding device 34 and the second welding device 42 or another portion of the welding apparatus is configured to position the second and fourth parts 40, 50 with respect to the first part 38 and the third part 48. By way of example, the second part and fourth parts 40, 50 may be located with the first and second welding devices 34, 42. The welding devices 34, 42 are located with the first activation device 56 and the second activation device 58. The first and second welding devices 34, 42 may be configured to selectively hold the second part and fourth parts 40, 50. Then, an operator of the welding apparatus commands the controller 28 to begin the welding operation.

The welding operation comprises a part measuring process and a welding process. The part measuring process is performed before the welding process to measure and record axial deviation of the first and third parts 38, 48. In other words, the part measuring process measures differences in axial length between the first and third parts 38, 48.

Once commanded by the operator, the first clamping device 32 and the second clamping device 44 are placed in the partially engaged position about the first end portions 88, 88' of the first part 38 and the third part 48 to substantially orient the axes of each of the parts 38, 48 along an axis the welding apparatus. The third actuation device 60 and the fourth actuation device 62 are engaged and are used to put the clamping devices 32, 44 in the partially engaged position. After the first clamping device 32 and the second clamping device 44 are placed in the partially engaged position, the first welding device 34 and the second welding device 42 apply a force to the second and fourth parts 40, 50 using the hydraulic device 24. The force applied using the hydraulic device 24 urges each of the second and fourth parts 40, 50 against the second end portion 90, 90' of the first and third parts 38, 48, respectively. The second and fourth parts 40, 50 contact the first and third parts 38, 48, and applies a force thereto. The force applied to the first and third parts 38, 48 by the second and fourth parts 40, 50 causes the first and third parts 38, 48, the part coupling portion 68, and a portion of the slide device 66 to move with respect to a remaining portion of the slide device 66 and the support portion 64. More particularly, the second plate 78 moves with respect to the first plate 74 as a result of the force.

The force applied by the hydraulic device 24 equalizes between the first and third parts 38, 48, resulting in an axial shift of the first and third parts 38, 48, and thus the part coupling portion 68, away from one of the welding devices 34, 42 toward the other welding device 34, 42 to compensate for any differences in length of the parts 38, 48. More particularly, the second plate 78 moves away from one of the welding devices 34, 42 toward the other welding device 34, 42.

Once a predetermined amount of force has been applied, the at least one position sensor 36, 46 determines a position of at least one of the second end portions 90, 90' of the parts 38, 48. Following this step, pressure applied by the hydraulic device 24 may be relieved and the welding devices 34, 42 may be backed away from the second end portions 90, 90' of the parts 38, 48.

Information collected by the position sensors is transmitted to the controller 28 to instruct the welding devices 34, 42 in performing the welding process. Specifically, the information collected by the position sensors 36, 46 is used to determine positions of the welding devices 34, 42 during the welding process. Next, the first clamping device 32 and the second clamping device 42 are placed in the partially engaged position to substantially orient the axes of each of parts 38, 48 along an axis the welding apparatus has been configured for. After the first clamping device 32 and the second clamping device 44 are placed in the partially engaged position, the first welding device 34 and the second welding device 42 move to a position determined by the controller 28 based on the information collected by the position sensors 36, 46. Then, the position sensors 36, 46 determine a position of at least one of the second end portions 90, 90' of the first part 38 and the third part 48 to confirm that the position of the second end portion 90, 90' matches the information collected by the position sensors 34, 36 during the first part measuring process. Upon confirmation that the length difference between the parts 38, 48, if any, is taken into account, the first clamping device 32 and the second clamping device 44 are placed in the engaged position, coupling the parts 38, 48 to the clamping devices 32, 44, respectively. The third and fourth activation devices 60, 62 are engaged to put the clamping devices 32, 44 in the engaged position. In one embodiment, the foregoing may involve that the parts 38, 48 and the part coupling portions 68 are asymmetrically located with respect to the welding devices 34, 42.

Next, the first welding device 34 and the second welding device 42 weld the first and third parts 38, 48 to the second and fourth parts 40, 50. Upon completion of the welding process, the first clamping device 32 and the second clamping device 44 are placed in the disengaged position and the welding devices are backed away, allowing the operator of the welding apparatus to remove each of the first parts (now including the second parts welded thereto) from the welding apparatus.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method of welding parts, comprising:
providing a first welding assembly, wherein said first welding assembly comprises at least one first position sensor and a first welding device;
providing a second welding assembly, wherein said second welding assembly comprises at least one second position sensor and a second welding device;
securing a first end portion of a first part to a part coupling portion, wherein said part coupling portion is located between said first welding device and said second welding device, wherein said part coupling portion is capable of axial movement by way of a slide device that connects said part coupling portion to a pedestal assembly, wherein said slide device has a first plate, a second plate, and axial restraint devices coupled to said first plate and said second plate of said slide device, wherein said first plate is connected to said pedestal assembly and said second plate is connected to said part coupling portion;
securing a first end portion of a third part to said axially movable part coupling portion;
securing a second part to said first welding device, wherein said first welding device and said second part located adjacent to a second end portion of said first part;
securing a fourth part to said second welding device, wherein said second welding device and said fourth part located adjacent to a second end portion of said third part, wherein said first part, said second part, said third part and said fourth part are in axial alignment;
simultaneously moving said first and second welding devices and said respective second and fourth parts towards said second end portions of said first and third parts to apply a force such that a difference in length between said first and third parts causes an amount of axial displacement of said part coupling portion until said force equalizes between said first and third parts;
measuring a difference in axial length between said first and third parts with said at least one first and second position sensors;
determining a position of said second end portion of said first part and/or said second end portion of said third part by a controller, wherein said position of said second end portion of said first part and/or said second end portion of said third part is determined based on said amount of axial displacement measured by said at least one first and second position sensors;
communicating said position of said second end portion of said first part and/or said second end portion of said third part to said controller for determining a welding position for each of said first and second welding devices, wherein said controller determines said first and second welding positions;
backing away said first and second welding devices away from said second end portions of said first and third parts;
moving said first and second welding devices to said respective welding positions determined;
confirming said position of said second end portions of said first and third parts matches said position determined by said controller; and
simultaneously welding said second and fourth parts to said respective second end portions of said first and third parts.

2. The method of claim 1, further comprising:
engaging partially a first clamping device about said second end portion of said first part and a second clamping device about said second end portion of said third part, wherein said step of partially engaging said first and said second clamping devices about said first and third parts orients the axes of said first and third parts along a welding axis.

3. The method of claim 2, further comprising:
engaging said first and second clamping devices prior to simultaneously welding said second and fourth parts to said second end portions of said first and third parts.

4. The method of claim 1, further comprising:
providing a hydraulic device, wherein said hydraulic device is connected to said controller and said first and second welding devices to facilitate said force for moving said first and second welding devices.

5. The method of claim 1, wherein after said force equalizes, said force is relieved and said first and second welding devices are backed away from said opposite ends of said first and third parts.

6. The method of claim 1, wherein said first part is a drive shaft tube, wherein said second part is an end fitting, wherein said third part is a drive shaft tube, and wherein said fourth part is an end fitting.

7. The method of claim 1, wherein each of said axial restraint device has a spring that resists a force trying to move said second plate of said slide device to a terminal position and biases said second plate to a neutral position.

8. A method of joining workpieces, comprising:
providing at least one first position sensor and at least one second position sensor;
securing a first end portion of two first workpieces to a part coupling portion, wherein each of said two first workpieces have a second end portion opposite said first end portion, wherein said two first workpieces are axially fixed with respect to each other but are capable of moving axially together by way of a slide device that connects said part coupling portion to a pedestal assembly, wherein said slide device has a first plate, a second plate, and axial restraint devices coupled to said first plate and said second plate of said slide device, wherein said first plate is connected to said pedestal assembly and said second plate is connected to said part coupling portion, wherein one of two second workpieces is positioned adjacent to each of said second end portions of said two first workpieces;
simultaneously moving said two second workpieces towards each other such that a difference in length between said two first workpieces causes one of said two second workpieces to contact said second end portion of one of said first workpieces to axially move said slide device until said other of said two second workpieces contacts said second end portion of said other of said two first workpieces and an amount of force applied onto said first two workpieces equalizes;
sensing a position of at least one of said second end portions of said two first workpieces, wherein said position is sensed by said at least one first and second position sensors by measuring a difference in axial length between said two first workpieces;

communicating said position of at least one of said second end portions of said two first workpieces sensed to a controller for determining a joining position adjacent each of said second end portions of said two first workpieces, wherein said controller determines said joining position of said first two workpieces;

backing away said two second workpieces away from said two first workpieces;

moving said two second workpieces to said respective joining positions;

confirming said position of at least one of said second end portions of said two first workpieces matches said joining position determined by said controller; and simultaneously joining said two second workpieces to said second end portions of said two first workpieces respectively.

9. The method of claim 8, wherein said at least one first position sensor is used to determine said position of said second end portion one of said two first workpieces, and said at least one second position sensor is used to determine said position of said second end portion of said other of two first workpieces.

10. The method of claim 8, wherein said second plate of said slide device moves with said two first workpieces and second plate of said slide device is fixed with respect to said two first workpieces.

11. The method of claim 8, wherein welding devices are positioned adjacent an interface of said two first workpieces and said two second workpieces to join said two first and second workpieces together.

12. The method of claim 10, wherein said axial movement of said slide device on linear bearings is restricted by said axial restraint devices, wherein each of said axial restraint devices have a spring that resists a force trying to move said second plate of said slide device that moves with said two first workpieces to a terminal position and biases said second plate to a neutral position.

13. The method of claim 8, wherein said first two workpieces are drive shaft tubes, and wherein said second two workpieces are end fittings.

\* \* \* \* \*

UNITED STATES PATENT AND TRADEMARK OFFICE
CERTIFICATE OF CORRECTION

PATENT NO. : 10,265,809 B2
APPLICATION NO. : 14/392109
DATED : April 23, 2019
INVENTOR(S) : Christopher M. Nijakowski and Anthony F. Kehres Page 1 of 1

It is certified that error appears in the above-identified patent and that said Letters Patent is hereby corrected as shown below:

In the Claims

Claim 7, Column 8, Line 35 the word "device" should be replaced with the word "devices"

Signed and Sealed this
Thirtieth Day of July, 2019

Andrei Iancu
*Director of the United States Patent and Trademark Office*